(12) United States Patent
Penagulur et al.

(10) Patent No.: US 8,095,428 B2
(45) Date of Patent: Jan. 10, 2012

(54) METHOD, SYSTEM, AND MEDIUM FOR WINNING BID EVALUATION IN AN AUCTION

(75) Inventors: Narendra Penagulur, Sunnyvale, CA (US); Narinder Singh, Sunnyvale, CA (US); Yan Cui, Sunnyvale, CA (US); Lenin K Subramanian, Mountain View, CA (US)

(73) Assignee: SAP AG, Walldorf (DE)

( * ) Notice: Subject to any disclaimer, the term of this patent is extended or adjusted under 35 U.S.C. 154(b) by 1223 days.

(21) Appl. No.: 11/590,969

(22) Filed: Oct. 31, 2006

(65) Prior Publication Data

US 2007/0100740 A1    May 3, 2007

(51) Int. Cl.
*G06Q 30/00* (2006.01)

(52) U.S. Cl. .................................. 705/26.3
(58) Field of Classification Search ............ 705/26, 705/27, 37, 26.3
See application file for complete search history.

(56) References Cited

U.S. PATENT DOCUMENTS

| | | | |
|---|---|---|---|
| 5,101,353 A | 3/1992 | Lupien et al. |
| 5,774,553 A | 6/1998 | Rosen |
| 5,774,873 A | 6/1998 | Berent et al. |
| 5,835,896 A | 11/1998 | Fisher et al. |
| 5,890,138 A | 3/1999 | Godin et al. |
| 6,047,268 A | 4/2000 | Bartoli et al. |
| 6,058,416 A | 5/2000 | Mukherjee et al. |
| 6,076,074 A | 6/2000 | Cotton et al. |
| 6,266,652 B1 | 7/2001 | Godin et al. |
| 6,285,989 B1 | 9/2001 | Shoham |
| 6,304,858 B1 | 10/2001 | Mosler et al. |
| 6,370,547 B1 | 4/2002 | Eftink |
| 6,388,183 B1 | 5/2002 | Leh |
| 6,408,282 B1 | 6/2002 | Buist |
| 6,415,270 B1 | 7/2002 | Rackson et al. |
| 6,415,320 B1 | 7/2002 | Hess et al. |
| 6,442,258 B1 | 8/2002 | Mashinsky |
| 6,510,216 B1 | 1/2003 | Burr et al. |
| 6,609,108 B1 | 8/2003 | Pulliam et al. |
| 6,745,350 B1 | 6/2004 | Cline et al. |
| 6,792,399 B1 | 9/2004 | Phillips et al. |
| 6,868,525 B1 | 3/2005 | Szabo |
| 6,871,190 B1 | 3/2005 | Seymour et al. |
| 6,947,906 B1 * | 9/2005 | Underwood et al. .......... 705/37 |
| 6,971,105 B1 | 11/2005 | Weber et al. |
| 6,983,395 B2 | 1/2006 | Chen et al. |
| 7,047,210 B1 | 5/2006 | Srinivasan |
| 7,107,227 B1 | 9/2006 | Bezos et al. |
| 7,110,967 B1 | 9/2006 | Espenes et al. |

(Continued)

OTHER PUBLICATIONS

Bidgolia, Hossein "The Internet Encyclopedia vol. 1" John Wiley & Sons, Inc., 2004.*

(Continued)

*Primary Examiner* — Yogesh C Garg
*Assistant Examiner* — Matthew Zimmerman
(74) *Attorney, Agent, or Firm* — Kenyon & Kenyon LLP (57) ABSTRACT

An internal auction system may allow a seller to enter a scheduled auction. The scheduled auction may be a simple scheduled auction and a conditional scheduled auction. The internal auction system may receive parameters for the scheduled auction, determine a scheduled auction as a function of the received parameters, create the scheduled auction, and publish the scheduled auction at a specified start time on a seller e-commerce site visible to a buyer. A simple scheduled auction may be associated with a start time and a duration. A conditional scheduled auction may be associated with a condition and an action to be executed when the condition evaluates to a specified value.

13 Claims, 6 Drawing Sheets

400

| Conditions | Actions | |
|---|---|---|
| Bid does not reach $X amount in Y days | Add new target group to auction | 408 |
| Auction ends successfully | Check inventory levels; place available inventory on hold; create new auction with a higher starting price | 410 |
| Auction ends unsuccessfully | Create new auction with new product description | 412 |
| Auction ends unsuccessfully | Create direct product sales | 414 |

404    402    406

U.S. PATENT DOCUMENTS

| | | | |
|---|---|---|---|
| 7,136,903 | B1 | 11/2006 | Phillips et al. |
| 7,149,720 | B2 | 12/2006 | Shepherd |
| 7,158,944 | B1 | 1/2007 | Settle, III |
| 7,191,147 | B2 | 3/2007 | Heene et al. |
| 7,209,895 | B2 | 4/2007 | Kundtz et al. |
| 7,216,103 | B2 | 5/2007 | Friedland et al. |
| 7,228,287 | B1 | 6/2007 | Samson et al. |
| 7,237,717 | B1 | 7/2007 | Rao et al. |
| 7,249,061 | B1 | 7/2007 | Suzuki |
| 7,263,498 | B1 | 8/2007 | Van Horn et al. |
| 7,289,967 | B1 | 10/2007 | Brader-Araje et al. |
| 7,310,610 | B2 | 12/2007 | Fujita et al. |
| 7,324,968 | B2 | 1/2008 | Rotman et al. |
| 7,457,778 | B2 | 11/2008 | Li et al. |
| 7,461,022 | B1 | 12/2008 | Churchill et al. |
| 7,490,242 | B2 | 2/2009 | Torres et al. |
| 7,493,280 | B2 | 2/2009 | Guler et al. |
| 7,496,533 | B1* | 2/2009 | Keith ............................... 705/37 |
| 7,505,935 | B2 | 3/2009 | Mendiola et al. |
| 7,552,081 | B2 | 6/2009 | Dutta et al. |
| 2001/0029478 | A1* | 10/2001 | Laster et al. ..................... 705/37 |
| 2001/0037255 | A1 | 11/2001 | Tambay et al. |
| 2001/0042041 | A1* | 11/2001 | Moshal et al. ................... 705/37 |
| 2001/0044751 | A1 | 11/2001 | Pugliese, III et al. |
| 2001/0049647 | A1* | 12/2001 | Sheehan et al. ................. 705/37 |
| 2001/0049654 | A1 | 12/2001 | Cecchetti et al. |
| 2001/0054021 | A1 | 12/2001 | Kawakura et al. |
| 2002/0002500 | A1 | 1/2002 | Takahashi |
| 2002/0032018 | A1 | 3/2002 | Morton et al. |
| 2002/0032621 | A1 | 3/2002 | Smith et al. |
| 2002/0046153 | A1 | 4/2002 | Piggins |
| 2002/0062251 | A1 | 5/2002 | Anandan et al. |
| 2002/0072999 | A1 | 6/2002 | Andres et al. |
| 2002/0082974 | A1 | 6/2002 | Berstis |
| 2002/0082977 | A1 | 6/2002 | Hammond et al. |
| 2002/0087456 | A1 | 7/2002 | Abeshouse et al. |
| 2002/0095357 | A1 | 7/2002 | Hunter et al. |
| 2002/0095441 | A1 | 7/2002 | Lakhani et al. |
| 2002/0099641 | A1 | 7/2002 | Mills et al. |
| 2002/0107779 | A1 | 8/2002 | Maltzman |
| 2002/0111874 | A1 | 8/2002 | Al-Kazily |
| 2002/0111895 | A1 | 8/2002 | Blair |
| 2002/0116215 | A1 | 8/2002 | Lawrence et al. |
| 2002/0116281 | A1 | 8/2002 | Costello et al. |
| 2002/0120552 | A1 | 8/2002 | Grey et al. |
| 2002/0128913 | A1 | 9/2002 | Ower |
| 2002/0138342 | A1 | 9/2002 | Clark et al. |
| 2002/0138399 | A1 | 9/2002 | Hayes et al. |
| 2002/0143909 | A1 | 10/2002 | Botz et al. |
| 2002/0147655 | A1 | 10/2002 | Say |
| 2002/0165817 | A1 | 11/2002 | Rackson et al. |
| 2002/0178104 | A1 | 11/2002 | Hausman |
| 2002/0178166 | A1 | 11/2002 | Hsia |
| 2002/0188551 | A1 | 12/2002 | Grove et al. |
| 2002/0194051 | A1 | 12/2002 | Hall et al. |
| 2003/0033179 | A1* | 2/2003 | Katz et al. ......................... 705/7 |
| 2003/0036975 | A1 | 2/2003 | Martin et al. |
| 2003/0041011 | A1* | 2/2003 | Grey et al. ....................... 705/37 |
| 2003/0051164 | A1 | 3/2003 | Patton |
| 2003/0055668 | A1 | 3/2003 | Saran et al. |
| 2003/0126150 | A1 | 7/2003 | Chan |
| 2003/0154134 | A1 | 8/2003 | Wang |
| 2003/0163831 | A1 | 8/2003 | Gall et al. |
| 2003/0216959 | A1* | 11/2003 | Vitti ............................... 705/14 |
| 2003/0220867 | A1* | 11/2003 | Goodwin et al. ............... 705/37 |
| 2003/0229545 | A1* | 12/2003 | Veres et al. ..................... 705/26 |
| 2004/0093525 | A1 | 5/2004 | Larnen |
| 2004/0098333 | A1 | 5/2004 | Meesseman |
| 2004/0117293 | A1 | 6/2004 | Lammle et al. |
| 2004/0128224 | A1 | 7/2004 | Dabney et al. |
| 2004/0158549 | A1 | 8/2004 | Matena et al. |
| 2004/0220821 | A1 | 11/2004 | Ericsson et al. |
| 2004/0250009 | A1 | 12/2004 | Chen et al. |
| 2004/0267719 | A1 | 12/2004 | Doherty et al. |
| 2005/0010483 | A1 | 1/2005 | Ling |
| 2005/0018667 | A1 | 1/2005 | Chandra et al. |
| 2005/0033648 | A1* | 2/2005 | Jin et al. .......................... 705/26 |
| 2005/0033683 | A1 | 2/2005 | Sacco et al. |
| 2005/0080714 | A1 | 4/2005 | McHale et al. |
| 2005/0097005 | A1 | 5/2005 | Fargo |
| 2005/0114225 | A1 | 5/2005 | Longman et al. |
| 2005/0114229 | A1* | 5/2005 | Ackley et al. ................... 705/26 |
| 2005/0187859 | A1 | 8/2005 | Growney et al. |
| 2005/0197950 | A1* | 9/2005 | Moya et al. ..................... 705/37 |
| 2005/0203824 | A1 | 9/2005 | Freud et al. |
| 2005/0209904 | A1* | 9/2005 | Hayashi ............................ 705/9 |
| 2005/0262000 | A1 | 11/2005 | Sato |
| 2005/0283425 | A1 | 12/2005 | Grove et al. |
| 2005/0289042 | A1 | 12/2005 | Friesen |
| 2006/0004648 | A1 | 1/2006 | Singh et al. |
| 2006/0037075 | A1* | 2/2006 | Frattura et al. .................. 726/22 |
| 2006/0143109 | A1* | 6/2006 | Goel ............................... 705/37 |
| 2006/0155637 | A1 | 7/2006 | Hawkes et al. |
| 2006/0184443 | A1 | 8/2006 | Erez et al. |
| 2007/0011082 | A1 | 1/2007 | Lynch |
| 2007/0043647 | A1 | 2/2007 | Bickford |
| 2007/0179879 | A1 | 8/2007 | Pomeranz et al. |
| 2007/0203820 | A1 | 8/2007 | Rashid |
| 2007/0214075 | A1* | 9/2007 | Ablan .............................. 705/37 |
| 2007/0239594 | A1 | 10/2007 | Conwell |
| 2007/0299765 | A1 | 12/2007 | Smith et al. |
| 2008/0294544 | A1 | 11/2008 | Harrington et al. |
| 2009/0030813 | A1 | 1/2009 | Wiesehuegel et al. |

OTHER PUBLICATIONS

R. Preston McAfee, Daniel C. Quan, Daniel R. Vincent, "How to Set Minimum Acceptable Bids, with an Application to Real Estate Auctions," *The Journal of Industrial Economics*, vol. 50 No. 4, Dec. 2002, pp. 391-416. Retrieved via ProQuet.

Mestelman, S., Welland, D., "Experience and inventory management in double-auction markets," Journal of Economic Behavior and Organization, 26(1995) pp. 35-48.

Auctionwatch Buy Now Storefronts FAQ.pdf, 20010609.

Auction Wizard 2000 Tourinventory, 20021011.

How to Use-Auction Manager Pro-Inventory Management, 20010417.

Auctionwatch How to Use auction manager pro 0611 112001 www.auctionwatch.comlhelplamprolamprohowo~v31_bach.htm(11 of 7) accessed Feb. 24, 2008.

www.auctionwatch.com. Dec. 4, 2001 (Apr. 12, 2001). Recovered from www.Archive.org on Feb. 1, 2008.

AuctionWatch Business Solution Services.pdf, 20010616.

Auction Watch Products.pdf, 20020802.

Overstock, Oct. 2004, http://web.archive.org/web/20040912-20041102re_/http://overstock.com.

Flaim, Denise, "The E-Shopper: Playing a Hardball Game on eBay," Newsday, Long Island, NY, Jun. 6, 2001, p. C07.

Spanbauer, Scott, "How to Make Cash on eBay: Your Auction ABSs," PC World, Jul. 2003, vol. 21, Iss. 7, p. 150.

Auction Tamer, Apr. 9, 2003, http://web.archive.org/web/20030409155905/http://www.auctiontamer.com/auctionlisting.htm.

D.5.2, Creation of high performance DG-related databases for Information Services, M. Nov. 21, 2003, accessible (but protected) at http://www.iset.uni-kassel.de/dispower static/documents/de152.pdf.

Envision Software, Inc.: Auction Tamer-Seller Add-on/Auction Poster Pro Feature, http://auctiontamer.com/auctionlisting.htm. pp. 1-13.

Geldman, A., "Evaluating e-Bay Seller Software," http://www.auctionbytes.com/cab/abu/v204/m05/abu0119/s02, pp. 1-3.

* cited by examiner

| Conditions | Actions |
|---|---|
| Bid does not reach $X amount in Y days | Add new target group to auction |
| Auction ends successfully | Check inventory levels; place available inventory on hold; create new auction with a higher starting price |
| Auction ends unsuccessfully | Create new auction with new product description |
| Auction ends unsuccessfully | Create direct product sales |

| AuctionID | Date Entered | Product Description | Start Time | Duration | Lot Size | Starting Price | Final Bid |
|---|---|---|---|---|---|---|---|
| 1 | 9/15/05 | 2.5 GHz laptop | 10/1/2005 9:00am | 7 days | 5 | $1,500.00 | $2,312 |
| 2 | 10/1/05 | 2.5 GHz laptop | 10/7/2005 9:00am | 7 days | 4 | $1,300.00 | n/a |
| 3 | 9/20/05 | optical mouse | 11/1/2005 10:00pm | 10 days | 10 | $15.00 | n/a |

| 1 | 9/15/05 | 2.5 GHz laptop | 10/1/2005 9:00am | 7 days | 5 | $1,500.00 | $2,312 |

| AuctionID | Condition | Action |
|---|---|---|
| 1 | bid does not reach $500 in 3 days | modify auction to be visible to another group of bidders |
| 1 | auction ends successfully | create new auction with new start time |
| 3 | auction ends unsuccessfully | convert auction to direct product listing |

FIG. 6b
610

| 1 | auction ends successfully | create new auction with new start time |
|---|---|---| ions, in

METHOD, SYSTEM, AND MEDIUM FOR WINNING BID EVALUATION IN AN AUCTION

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND

Businesses traditionally look for effective ways in which to make their products available to potential buyers. In addition to sales through physical "brick and mortar" stores, innovative ways to sell products are often used especially to dispose of old or excess inventory. The advent of the Internet along with the accompanying revolution in computer and network technology has created new sales paradigms and allowed businesses to establish their own electronic commerce ("e-commerce") presence through the use of, for example, Internet Web sites. E-commerce sales have steadily grown and now account for a significant portion of business-to-consumer as well as business-to-business sales. Auctions make up a significant portion of e-commerce sales and have grown into an increasingly more important sales paradigm.

The revolution in network and computer capability along with the mass availability and development of the Internet facilitates alternative methods of sales such as auctions. Network-based electronic auctions, such as for example those conducted over the Internet, may allow a seller considerable control over an auction and may increase auction participation. For example, a seller may want to publish a scheduled auction to be published at a specified start time. Alternatively, a seller may want to publish a conditional scheduled auction including a condition and an action to be executed if the condition is true. The Internet and network-based computing provide the ability to aggregate large numbers of bidders for an auction in an easier and generally less costly manner than through traditional auctions. Though network-based auctions (e.g., Internet based auctions) provide significant advantages, the reliance on third party auction providers has limited a seller's control in a number of ways including through rules on the conformance of auction procedures and the loss of control over the format of the auction and bidding process.

Third party auction providers provide a large scale e-commerce community portal that brings together large numbers of buyers and sellers who gather to trade in goods and services. Commercial auction provide a powerful platform for the sale of goods and services among a community of individuals and businesses. These third party auction providers may provide auction services for the seller as well as access to a ready pool of potential buyers but in exchange they may require a seller to conform their auctioning processes and procedures. In addition, a third party auction provider typically takes a fee that may be fixed or proportional to the value of the auctioned goods and/or services. In both cases, the seller loses some degree of control over the auction process in exchange for using the third party auction service.

In addition to the limitations on auction procedures and processes imposed by a third party auction provider, a business may not be able to make maximum use of its business information in providing and generating auctions through a third party auction service.

Businesses have typically kept their information, including information regarding their assets and inventory they wish to sell or auction off, in database systems that are part of their corporate information systems. Conventional systems provide limited linking between these business information management systems and online Web auction services. Therefore, manual involvement with the Web auction service is required for each auction or sales posting conducted.

DETAILED DESCRIPTION

In one embodiment of the present invention, an internal auction system may provide a seller with capability to publish auctions to a buyer over a seller e-commerce site. The internal auction system may allow a seller to create a scheduled auction. The scheduled auction may be a simple scheduled auction and a conditional scheduled auction. The internal auction system may receive parameters for the scheduled auction, determine a scheduled auction as a function of the received parameters, create the scheduled auction, and publish the scheduled auction at a specified start time on a seller e-commerce site visible to a buyer. A simple scheduled auction may be associated with a start time. A conditional scheduled auction may be associated with a condition and an action to be executed when the condition evaluates to a specified value.

In another embodiment of the present invention, a procedure may be provided for scheduling an auction in an internal auction system using an internal auction application for a seller's e-commerce site. The procedure may include receiving parameters for a scheduled auction, the internal auction application determining the scheduled auction as a function of the received parameters, the internal auction application creating the scheduled auction, and publishing the scheduled auction on the seller's e-commerce site at the start time for the duration. The scheduled auction may be associated with properties including a start time and a duration. The received parameters may include the start time and the duration. The scheduled auction may also be associated with properties including a condition of the scheduled auction and an action to be executed when the condition evaluates to a specified value. The received parameters may include the condition and the action. The condition may be whether a bid price associated with the scheduled auction is less than a specified amount at a specified time after the start time associated with the scheduled auction. Alternatively, the condition may be whether the scheduled auction ended with a winning final bid. The scheduled auction may visible to a first target group of buyers and the action may be modifying the scheduled auction to make the scheduled auction visible to a second target group. Alternatively, the action may be to check an inventory level and place an inventory hold on a seller's business information management system. Alternatively, the action may be to determine another scheduled auction associated with another start time, the another start time after the start time associated with the scheduled auction. Alternatively, the action may be to modify a product description associated with the scheduled auction. Alternatively, the action may be to create a direct product listing with properties similar to the scheduled auction.

In another embodiment of the present invention, a system may be provided for scheduling auctions. The system may include a seller's e-commerce site and an internal auction system configured to interface with the seller's e-commerce site. The internal auction system may be configured to receive parameters for a scheduled auction, determine the scheduled auction as a function of the received parameters, create the scheduled auction, and publish the scheduled auction at the start time for the duration. The scheduled auction may be associated with properties including a start time and a duration. The scheduled auction may also be associated with properties including a condition of the scheduled auction and an action to be executed when the condition evaluates to a specified value. The received parameters may include the start time, the duration, the condition and the action.

In another embodiment of the present invention, a computer-readable medium may be provided including instructions adapted to execute a procedure for scheduling an auction in an internal auction system using an internal auction application for a seller's e-commerce site, the procedure including receiving parameters for a scheduled auction, determining by the internal auction application the scheduled auction as a function of the received parameters, creating by the internal auction application the scheduled auction, and publishing the scheduled auction on the seller's e-commerce site at the start time for the duration. The scheduled auction may be associated with properties including a start time and a duration. The scheduled auction may also be associated with properties including a condition of the scheduled auction and an action to be executed when the condition evaluates to a specified value. The received parameters may include the start time, the duration, the condition and the action.

Figure 1:
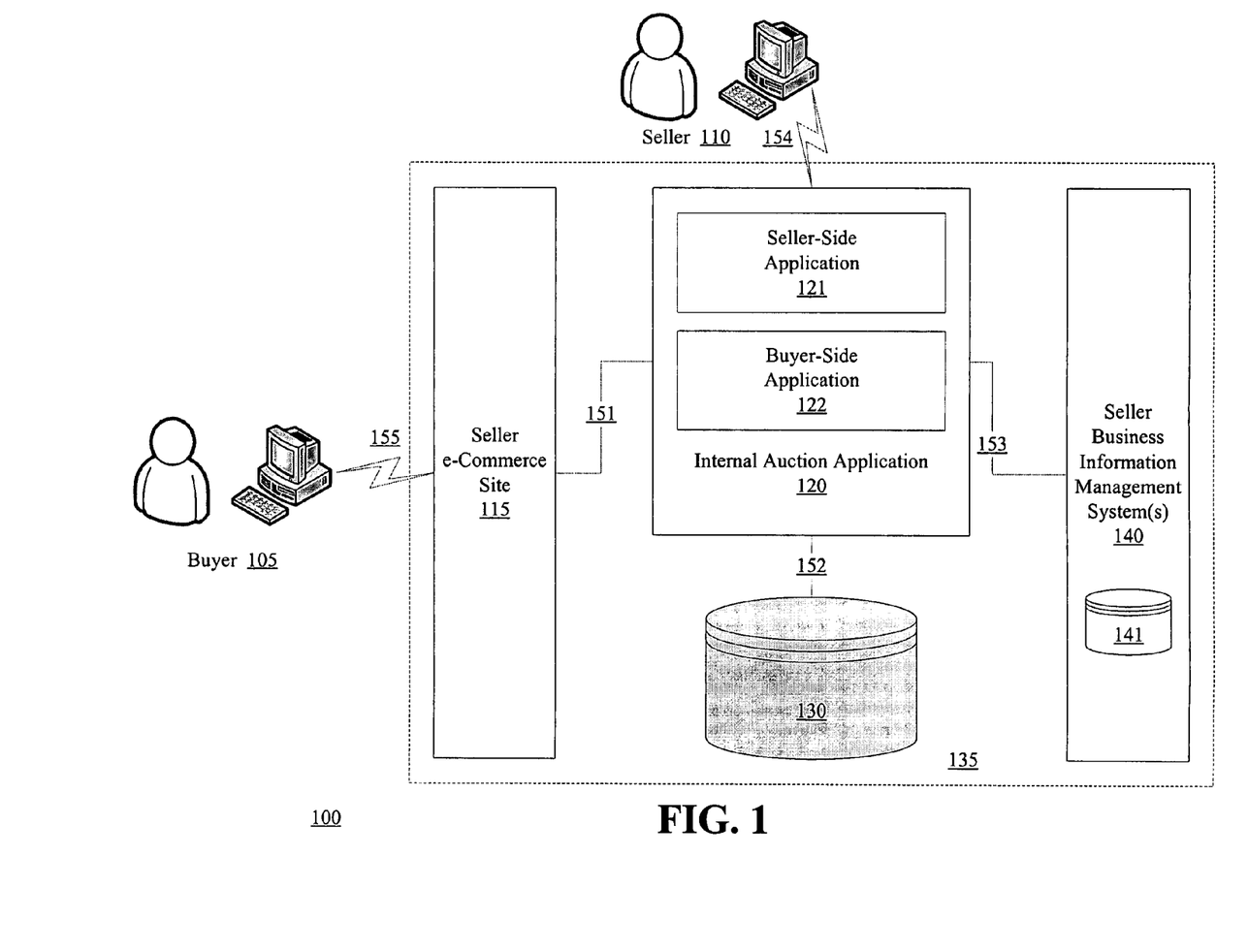
FIG. 1 illustrates an example integrated internal auction system, in accordance with an embodiment of the present invention.

FIG. 1 illustrates an example integrated internal auction system according to one embodiment of the present invention. A seller 110 may create an auction using an internal auction application 120 residing on the seller's information technology hardware environment 135. For example, the internal auction application 120 may consist of one or more software applications, programs, modules, procedures, or other computer code to include firmware and may additionally include data that resides on one or more servers, computers, or other hardware platforms that make up the seller's information technology hardware environment 135. The internal auction application 120 may contain a seller-side application 121 handling the seller interaction 154 with the integrated internal auction system 100 through the internal auction application 120. The seller-side application 121 may include features to allow the seller 110 to create, monitor, and manage one or more auctions. The internal auction application 120 may also be conceptualized as containing a buyer-side application 122 handling the buyer interaction 155 with the integrated internal auction system 100 allowing buyer interaction 155 with the internal auction application 120 and the seller's business information management system(s) 140 through a seller's e-commerce site 115. The buyer-side application 122 may provide the functionality allowing the buyer 105 to view auctions, participate in active auctions, monitor auctions, and perform the checkout process on won auctions. Though conceptually the functionality provided by the seller-side application 121 and the buyer-side application 122 of the internal auction application 120 are different, both may share data sets, procedures, libraries, and other elements of software code or data. In one embodiment of the present invention, all the elements of the internal auction application 120 may either be contained in both the conceptual subsets—seller-side application 121 and buyer-side application 122—or in an alternative embodiment the internal auction application 120 may contain additional elements of software code and/or data in addition to these conceptual subsets 121, 122. The internal auction application 120 uses data that may be contained in a seller's business information management system(s) 140 and/or may be stored in a local database 130 for the internal auction application 120. This local database 130 may be considered part of the internal auction application 120 in this embodiment of the present invention even if the database is stored separately in a memory system.

An internal auction application 120 may communicate 152 with the local database 130; communicate 153 with the seller's business information management system(s) 140; and communicate 151 with the seller's e-commerce site 115 using a communication network that is part of the seller's information technology hardware environment 135. For example, the seller's e-commerce site 115, internal auction application 120, local database 130, and business information management system(s) 140 may be located on servers or other computers that are part of a communication network—such as a local area network (LAN) or wide area network (WAN)—controlled by the seller. In an alternative embodiment, the seller's information technology hardware environment 135 may include a communication network that is shared by the seller with other network users. For example, the seller's e-commerce site 115, internal auction application 120, local database 130, and business information management system (s) 140 may be located on servers or other computers that are part of at least one internal seller communication network (e.g., a LAN and/or WAN) as well as a shared (i.e., shared by seller with other non-seller related entities) communication network such as the Internet. In either embodiment regardless of the network used for communication between the elements of the integrated auction system 100, seller communication 154 and buyer communication 155 with the integrated auction system 100 may occur over an external network (i.e., a network external to the seller and not under the seller's direct control), such as for example, the Internet. In an alternative embodiment, seller and buyer communication 154, 155 with the integrated auction application 100 may occur over a seller-controlled network (such as a seller-controlled wide area sales network) and/or may involve a combination of at least one seller-controlled network and at least one external network.

The integrated auction system 100 integrates a seller's business information management systems(s) 140, which serves as a backend system(s), with a seller's e-commerce site 115, serving as a front-end system, using an internal auction application 120 in order to provide auction services to the seller 110 and the buyer 105 according to one embodiment of the present invention. A seller business information management system 140 is a an application with at least one associated database 141 typically using a database management system (DBMS) that provides data storage and associated programming support for that data (e.g., a query system such as an SQL editor, optimization routines, program interfaces). For example, a seller may have an inventory control system 140 with its own inventory database 141 developed for use on a business information management system 140. The business information management system(s) 140 may contain product information and availability information used in generating an auction and performing order generation to fulfill a winning buyer's order according to one embodiment of the present invention. The seller's e-commerce site 110 allows a buyer 105 to participate in an auction over a communication network. For example, a seller Web site on the Internet offering goods and/or services (electronic commerce) is one example of a seller e-commerce site 115. An auction in the integrated auction system 100 is made available to the buyer 105 through the seller e-commerce site 115 which may serve as the buyer portal to the integrated auction system 100 according to one embodiment of the present invention. The seller 110 creates and manages auctions through the internal auction application 120 which integrates 153 information from the business information management system(s) 140 and provides the interaction processing 151 with the buyer 105 through the seller e-commerce site 115.

Figure 2:
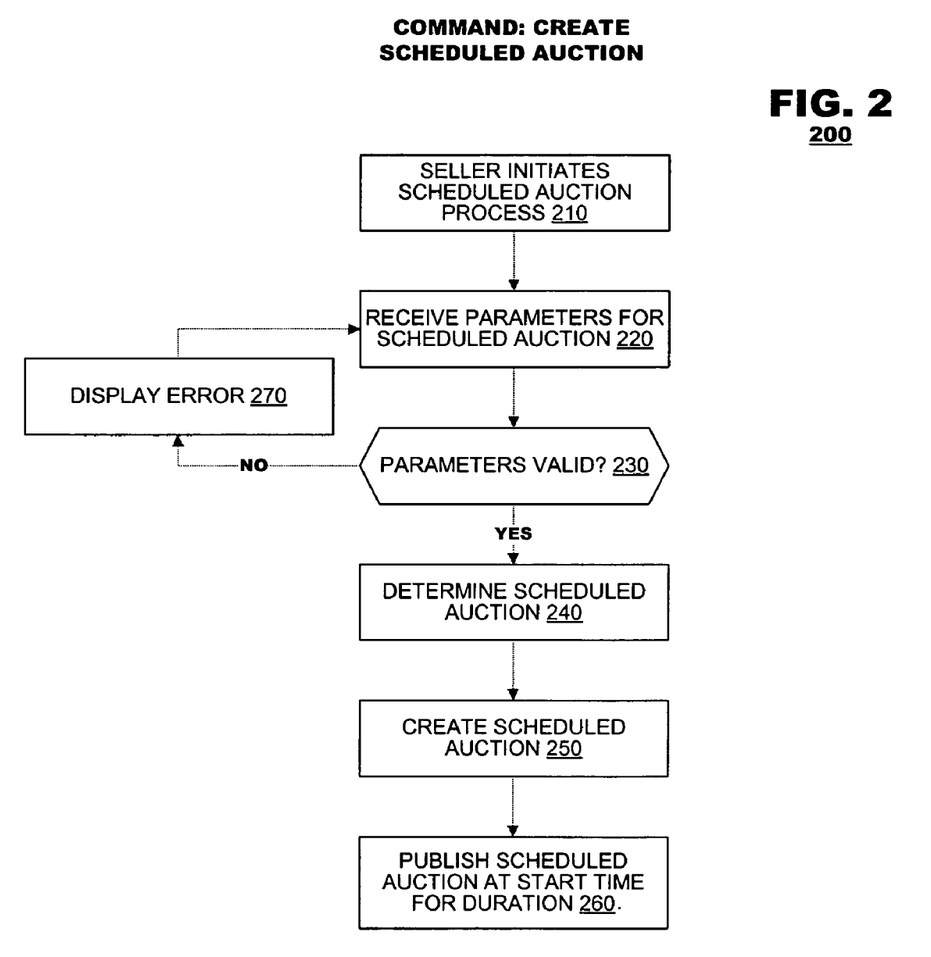
FIG. 2 illustrates an example procedure for creating a scheduled auction, in accordance with an embodiment of the present invention.

FIG. 2 illustrates an example procedure for creating a scheduled auction, in accordance with an embodiment of the present invention. In 210, the seller may initiate a scheduled auction process. For example, a scheduled auction may be simple or conditional. For example, a simple scheduled auction may be an auction associated with a start time and a duration. For example, a conditional scheduled auction may be associated with a condition and an action to execute when the condition equals a specified value.

For example, the seller may initiate the scheduled auction process by selecting a conventional link or button on a Internet browser executing on a terminal in communication with the internal auction application as depicted in FIG. 1. For example, the terminal may be a personal computer, a laptop computer or a wireless device such as a cellular phone or personal digital assistant.

Figure 4:
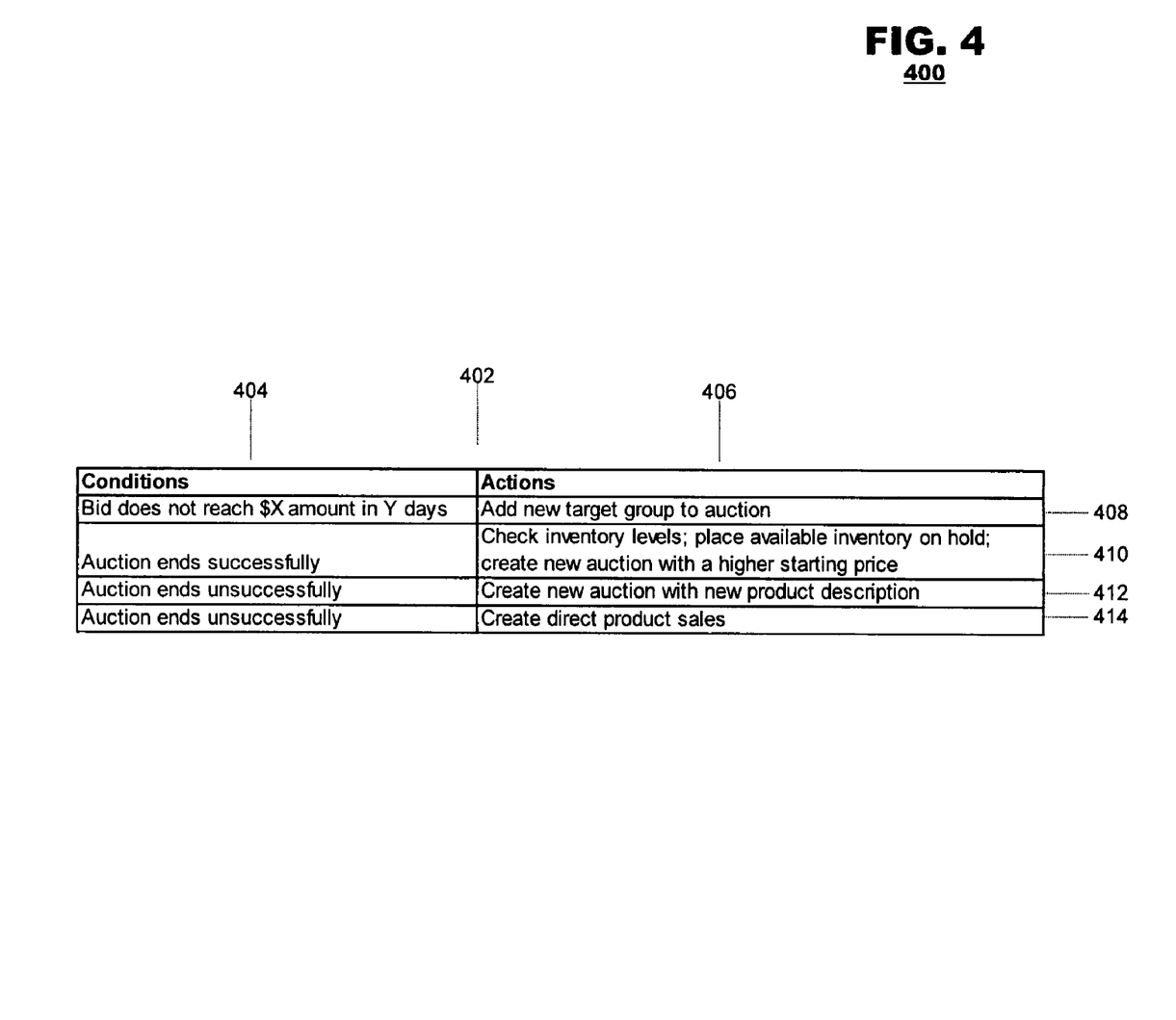
FIG. 4 illustrates an example table depicting available conditions and actions in a conditional scheduled auction, in accordance with an embodiment of the present invention.
Figure 6A:
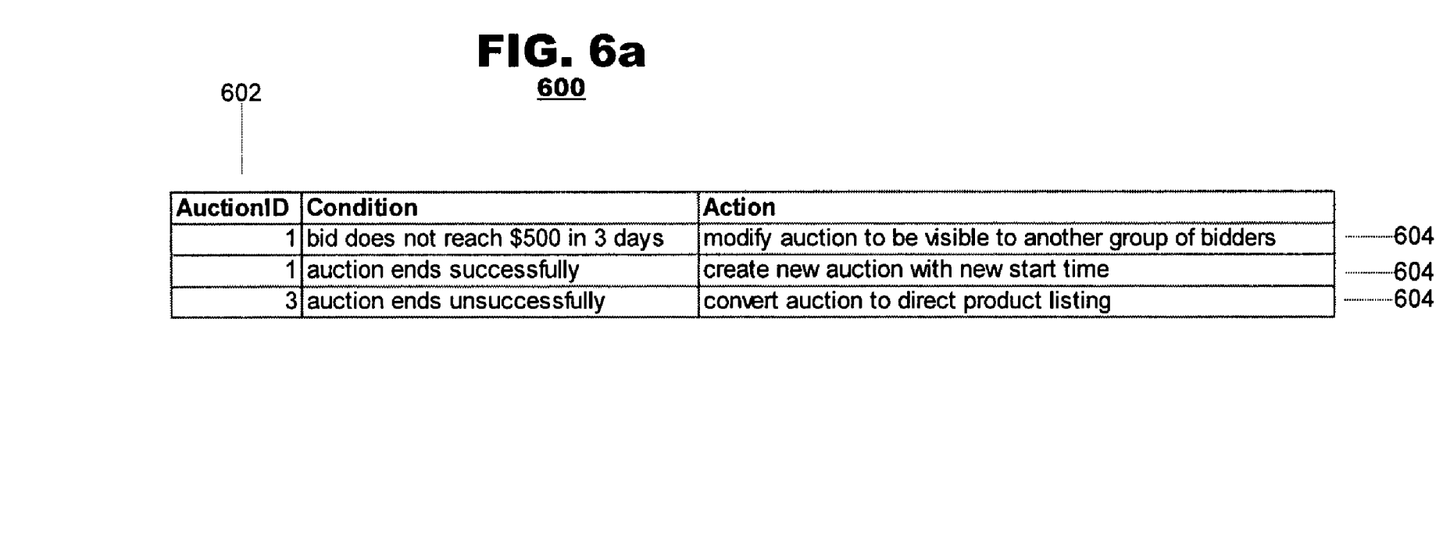
FIG. 6a illustrates an example condition-action table, in accordance with an embodiment of the present invention.
Figure 6B:
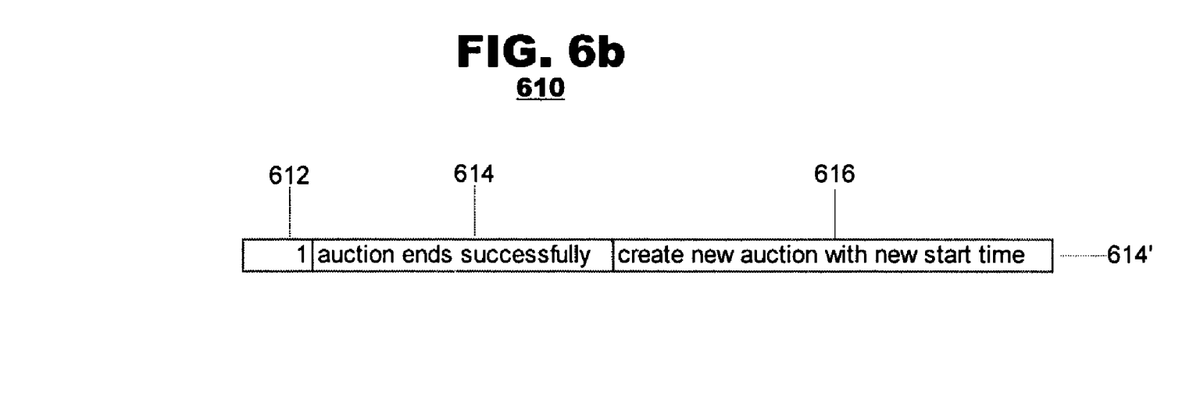
FIG. 6b illustrates an example condition-action table entry, in accordance with an embodiment of the present invention.

In 220, the internal auction application may receive parameters for the scheduled auction. The parameters for the scheduled auction may include a product description, a start time, a duration, a lot size, a starting price, a final bid, a target group of buyers and any special rules to an associated bidding process for the auction. For example, a scheduled auction may only be visible to a targeted group of buyers. A conditional scheduled auction may also be associated with parameters including a condition and an action. For example, a condition and an action may be as depicted in FIGS. 4, 6a and 6b.

For example, the target group of buyers may be defined in a customer database as meta data. The customer database may be part of the seller business information management system 140 as depicted in FIG. 1. The target group of buyers may be a subset of customers stored in the customer database. The subset of customers may be related in some manner, for example, customers from a specific geographic region.

For example, the parameters may be received from the seller through the seller interaction 154 as depicted in FIG. 1. Alternatively, a set of default parameters may be included in the internal auction application. For example, a default start time may be a time that the scheduled auction is created. For example, a default duration may be 7 days. For example, a default parameter may be used if a parameter is not received from the seller.

In 230, the parameters may be checked for validity. For example, the data types of the parameters may be checked to be correct. In addition, each parameter may be checked to be within an associated valid range or equal to a valid value. For example, a start time parameter may not be of a date and time in the past. For example, the duration parameter may not be a negative value. If the parameters are valid, the procedure proceeds to 240. If the parameters are invalid, the procedure proceeds to 270.

Figure 5A:
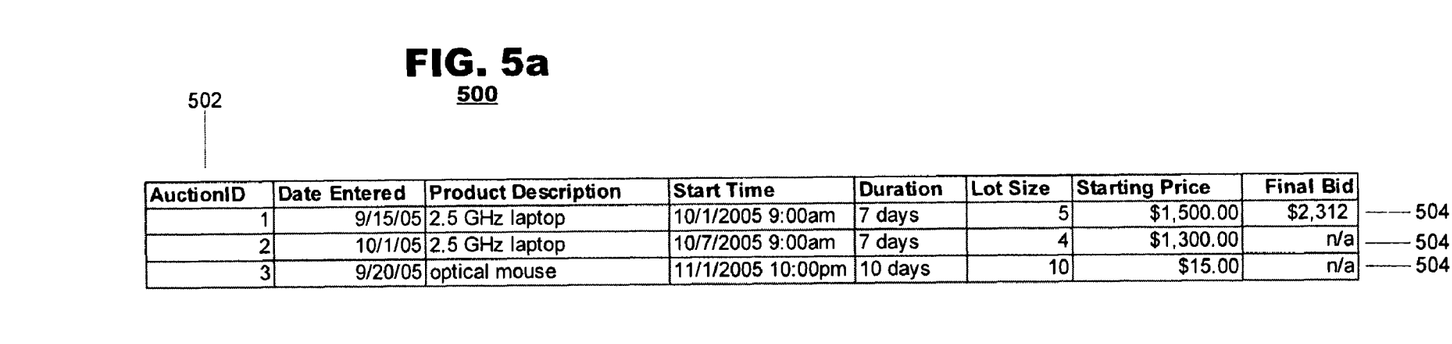
FIG. 5a illustrates an example auction properties table, in accordance with an embodiment of the present invention.
Figure 5B:
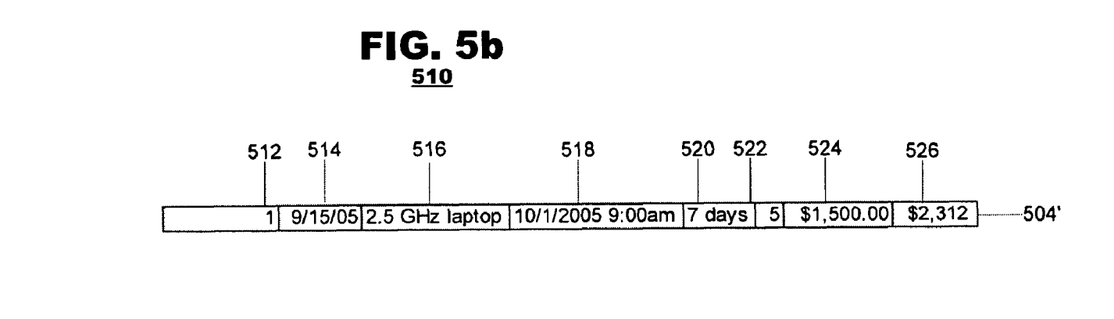
FIG. 5b illustrates an example auction properties table entry, in accordance with an embodiment of the present invention.

In 240, the scheduled auction may be determined. For example, a scheduled auction may include the fields of the auction properties table, as depicted in FIG. 5a. An auction properties table entry, as depicted in FIG. 5b, may represent the scheduled auction. The fields may be filled with values of the received parameters, user-input values or system/user determined defaults.

For example, the start time of the scheduled auction may be set to be a default value or the parameter received from the seller. The duration of the scheduled auction may be set to a default value or the parameter received from the seller. An entry may be created in an auction properties table as depicted in FIGS. 5a and 5b. The entry may reflect the scheduled auction being determined in 240.

In 250, the scheduled auction may be created. For example, the scheduled auction may be created by the internal auction application and stored on the local database as depicted in FIG. 1.

In 260, the scheduled auction may be published on the seller's e-commerce site at the start time and made available to the buyer as depicted in FIG. 1. Alternatively, the scheduled auction may be published immediately and the seller's e-commerce site may not display the scheduled auction until after the start time.

In 270, an error message may be displayed to the seller. For example, the error message may include the invalid parameters found in 230. For example, the error message may contain suggestions of corrections. For example, the error message may display the default parameter, if the default parameter is available. The procedure may proceed to 220 where a new set of parameters are received.

Figure 3:
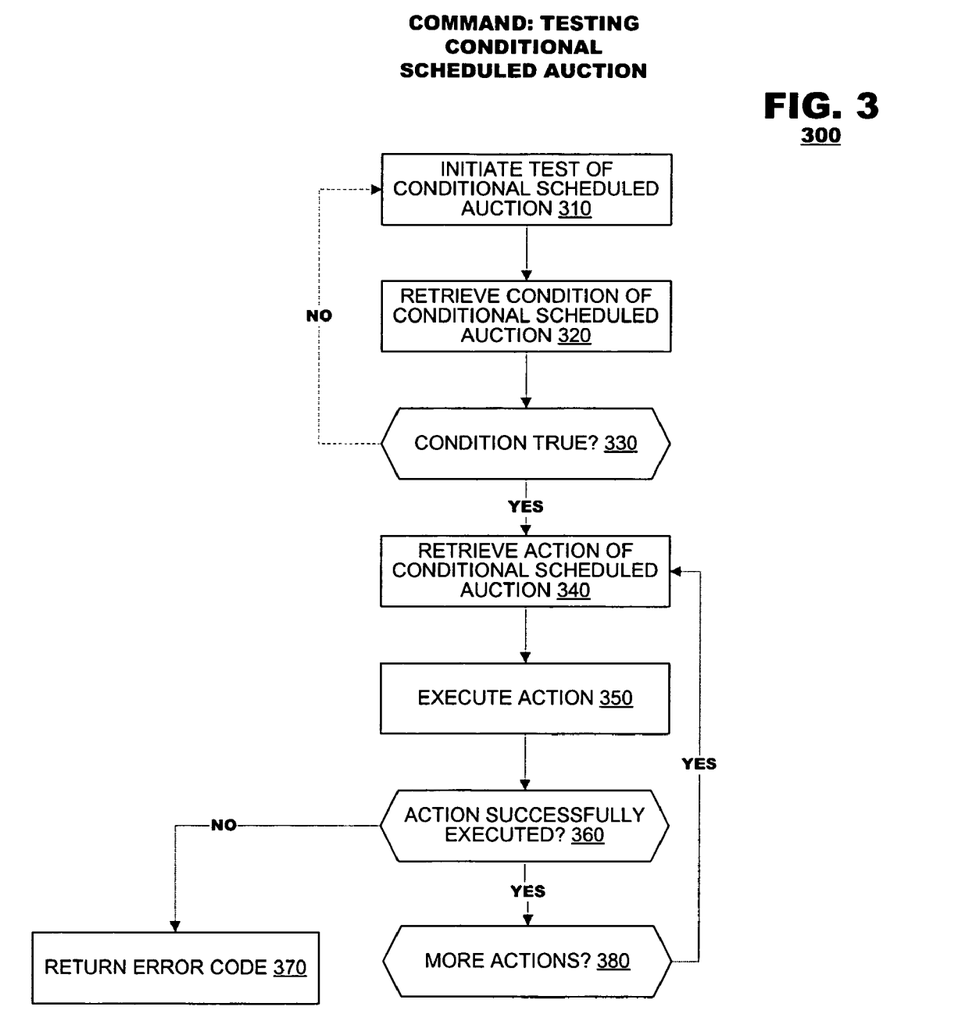
FIG. 3 illustrates an example procedure for testing and executing a conditional scheduled auction, in accordance with an embodiment of the present invention.

FIG. 3 illustrates an example procedure for testing and executing a conditional scheduled auction, in accordance with an embodiment of the present invention. A conditional scheduled auction may be associated with a condition and an action to be executed. In 310, the internal auction application may initiate a test of the condition associated with the conditional scheduled auction. The internal auction application may periodically test the condition of the conditional scheduled auction published on the seller e-commerce site and execute the action if appropriate. For example, the internal auction application may periodically poll the condition of the conditional scheduled auction.

For example, there may be more than one conditional scheduled auction published on the seller e-commerce site and managed by the internal auction application simultaneously. Each conditional scheduled auction may be associated with one or more conditions. Each conditional scheduled auction may also be associated with one or more actions. For example, the condition may be one depicted in FIGS. 4 and 6a, described later.

In 320, the internal auction application may retrieve the condition associated with the conditional scheduled auction for processing. If there is more than one condition associated with the conditional scheduled auction or if there is more than one conditional scheduled auction, the procedure depicted in FIG. 3 may be executed multiple times, once for each condition.

In 330, the condition may be evaluated. For example, if the condition evaluates to true, the procedure may proceed to 340. If the condition evaluates to false, the procedure may end. The procedure may begin again when the internal auction application is to test the condition. Alternatively, the procedure may proceed to 310 and restart the procedure.

In 340, the action associated with the conditional scheduled auction may be retrieved. For example, the action may be stored in the local database as depicted in FIG. 1. If the conditional scheduled auction is associated with more than one action, a first unexecuted action may be retrieved.

In 350, the action may be executed by the internal auction application. For example, the action may modify the conditional scheduled auction on the seller e-commerce site or the local database, or the action may create a new scheduled auction. For example, the action may one associated with a condition as depicted in FIGS. 4 and 6a, described later.

In 360, the procedure may test whether the action was successfully executed. For example, the procedure may check an error code or a return code provided by the executing of the action in 350. If the action was properly executed, the procedure may proceed to 380. If the action was not properly executed, the procedure may proceed to 370.

In 370, the action was not properly executed. The procedure may return an error code to the internal auction application and end. For example, the error code may be descriptive of the error encountered or the reason the action failed to execute.

In 380, the procedure may test if there are more actions associated with the conditional scheduled. If yes, the procedure may proceed to 340 to process the remaining actions. If no, the procedure may end.

FIG. 4 illustrates an example table depicting available conditions and actions in a conditional scheduled auction, in accordance with an embodiment of the present invention. For example, each scheduled auction may be associated with one or more conditions. Each condition may be associated with one or actions to be executed when the condition evaluates to be true. The example table 402 includes two columns 404 and 406. Column 404 may include the conditions stored in the internal auction application. Column 406 may include the actions stored in the internal auction application. Each entry in column 406 may be associated with a condition of column 404.

The example table 402 may include a plurality of rows 408, 410, 412 and 414. For example, each row may be associated with a scheduled auction. Each row may represent a condition and an action or a series of actions to be taken when the condition evaluates to be true.

Row 408 illustrates a condition of "bid does not reach $X in Y days." X may be a positive dollar amount. Y may be a duration in days. The condition of row 408 may evaluate to true when a scheduled auction has been published and available to buyers for Y days but the bid associated with the scheduled auction has not reached X dollars.

Row 408 illustrates an action of adding a new target group to the scheduled auction. For example, each scheduled auction may be visible to a specified target group of buyers. The action may be adding a second target group of buyers who can view and bid on the auction. The action illustrated in row 408 may add the second target group of buyers who may view and bid on the scheduled auction.

Row 410 illustrates a condition of "auction ends successfully." A scheduled auction may end successfully when there is a winning, final bid at the end of the duration associated with the scheduled auction. The scheduled auction may be associated with a winning final bid and a winning buyer.

Row 410 illustrates an action of checking inventory levels stored in the seller business information management system as depicted in FIG. 1. The internal auction application may retrieve the inventory levels of the product associated with the scheduled auction and determine whether there are more units of the product in inventory available for sale.

Row 410 also illustrates an action of putting one or more units of the product on hold in the seller business information management system. For example, the product may be marked with a "hold" or "reserved" designation in the seller business information management system.

Row 410 also illustrates an action of creating a new scheduled auction similar to the just-concluded scheduled auction except the starting price is higher. The starting price may be incremented by a default amount programmed in the internal auction application or a received amount. The received amount may be submitted by the seller. The scheduled auction may be for the units of products placed on hold in the above action. Placing the units of products on hold ensures that the products will be available if the schedule auction ends successfully.

Row 412 illustrates a condition of "auction ends unsuccessfully." A scheduled auction may end unsuccessfully where there is no winning final bid at the end of the duration associated with the schedule auction. Alternatively, the final bid may fail to satisfy a requirement or rule of the auction (for example, a reserve price that must be exceed for the bid to be a winning bid) and thus be a non-winning bid. Alternatively, no buyer may have placed a bid on the scheduled auction.

Row 412 illustrates an action of creating a new scheduled auction similar to the just-concluded scheduled auction except the product description may be modified.

Row 414 illustrates a condition similar to row 412, where an "auction ends unsuccessfully."

Row 414 illustrates an action of creating a direct product sales entry. A direct product sales entry may be an offer to sell a product in a non-auction format. The direct product sales entry published on the seller e-commerce site and visible to a buyer and may include all information of the unsuccessful scheduled auction except parameters related to the auction format, such as, starting bid, start time and duration. The start price of a direct product sales entry may be a price at which a buyer may immediately purchase the product.

FIG. 5a illustrates an example auction properties table, in accordance with an embodiment of the present invention. The auction properties table 502 may include a plurality of records 504, each record 504 representing one auction in the integrated internal auction system as depicted in FIG. 1.

It will be appreciated that the auction properties table 502 may be stored in a variety of ways accessible to a server. For example, it may be stored as a tab delimited or comma delimited flat file, in a relational database or another storage method accessible to a server.

FIG. 5b illustrates an example auction properties table entry, in accordance with an embodiment of the present invention. Each auction properties table entry may be a record 504' and may represent one auction. Each record 504' may contain a variety of information, such as an AuctionID 512. For example, AuctionID 512 may be an identifier associated with each record 504'. The AuctionID 512 may be a unique identifier comprising a string of alpha-numeric characters. For example, the record 504' indicates the AuctionID is 1.

The record 504' may also include a Date Entered 514. The Date Entered 514 may be a date that the auction was entered into the internal auction system. Alternatively, the Date Entered 514 may be a conventional field for storing a time in addition to the date.

The record 504' may also include a Product Description 516. The Product Description 516 may be a string variable containing a description of the product on auction. Alternatively, the Product Description 516 may be an identifier representing a description of the product on auction. For example, the record 504' indicates the Product Description is "2.5 GHz laptop."

The record 504' may also include a Start Time 518. The Start Time 518 may be a field representing a date and time when the auction will begin. For example, the record 504' indicates that the auction will begin on Oct. 1, 2005 at 9:00am. Alternatively, the Start Time 518 may be a field representing an auction starting date and time in another conventional format.

The record 504' may also include a Duration 520. The Duration 520 may be a field representing the length of time the auction will last. For example, the Duration 520 may be a period of time, such as minutes, hours, days, weeks, or months. For example, the record 504' indicates that the auction will last for 7 days.

The record 504' may also include a Lot Size 522. For example, the Lot Size 522 may indicate a lot size or quantity of products included in the auction. For example, the record 504' indicates that the auction is offering a lot size of 5.

The record 504' may also include a Starting Price 524. For example, the Starting Price 524 may indicate the beginning bid of the auction. For example, the record 504' indicates that the starting price is $1,500.

The record 504' may also include a Final Bid 526. For example, the Final Bid 526 may represent a winning bid of the auction. In this example, the Final Bid 526 may be assigned a value of zero or "not applicable" until the auction ends and a final bid has been determined. For example, the record 504' indicates that the final bid is $2,312.

FIG. 6a illustrates an example condition-action table, in accordance with an embodiment of the present invention. The condition-action table 602 may include a plurality of records 604, each record 604 representing one auction in the integrated internal auction system as depicted in FIG. 1.

It will be appreciated that the condition-action table 602 may be stored in a variety of ways accessible to a server. For example, it may be stored as a tab delimited or comma delimited flat file, in a relational database or another storage method accessible to a server.

FIG. 6b illustrates an example condition-action table entry, in accordance with an embodiment of the present invention. Each condition-action table entry may be a record 604' and may represent an action to be executed when a condition occurs with regards to an auction in the internal auction application. Each record 604' may contain a variety of information, such as an AuctionID 612. For example, AuctionID 612 may be an identifier of a scheduled auction associated with each record 604'. The AuctionID 612 may be a unique identifier comprising a string of alpha-numeric characters. For example, the record 604' indicates the AuctionID is 1.

The record 604' may also include a Condition 614. The Condition 614 may be a condition under which an action will be executed. The Condition 614 may be associated with an auction identified by AuctionID 612. The Condition 614 may be as depicted in FIG. 4. For example, the record 604' indicates the condition is when a bid for the auction does not reach $500 in 3 days.

The record 604' may also include an Action 616. The Action 616 may be an action executed when Condition 614 is true. The Action 616 may be associated with an auction identified by AuctionID 612. The Action 616 may be as depicted in FIG. 4. For example, the record 604' indicates the Action is to create a new auction with a new start time. For example, a seller may wish to continually create new auctions when an auction has been successful, demonstrating market demand.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A method for publishing a scheduled auction on a seller's network site in an internal auction system using an internal auction application, comprising:
    identifying, using a processing device, an auction record in an auction properties table of the auction system having a field satisfying a predetermined criteria, the auction record including an auction identifier field, an auction start time field, an auction product identifier field, an auction duration field, an auction lot size field, a starting price field, an original target group of bidders field, and a final bid field;
    automatically checking by the internal auction application whether a time in the start time field of the identified auction record has passed; and publishing the scheduled auction using data from the identified auction record on the seller's network site by the internal auction application responsive to a passing of the start time, the scheduled auction visible to buyers through a buyer-side application for a duration in the auction duration field;
    identifying, using the processing device, a condition-action record in a condition-action table having its auction identifier field match that of the identified auction record, each condition-action record also including a plurality of conditions and associated actions;
    evaluating, using the processing device, whether the scheduled auction ended with a winning final bid, wherein the winning final bid is evaluated as having occurred if there has been at least one bid in the scheduled auction or there has been at least one bid which has met a reserve price in the scheduled auction;
    responsive to evaluating that the scheduled auction ended with a winning final bid, automatically checking inventory levels in the seller business information system of a product associated with an auction product identifier in the an auction product identifier field and placing an available lot size inventory of the product on hold, the lot size obtained from the auction lot size field, and automatically creating a new auction with a higher starting price than in the start price field; and
    responsive to evaluating that the scheduled auction ended without a winning final bid, automatically creating a direct product sales entry in the seller business information system using the processing device to sell the product in a non-auction format, the direct product sales entry published on a seller e-commerce site, a published price of the product obtained from a price field in the identified auction record.

2. A method of claim 1, wherein at least one condition corresponding to the scheduled auction includes criteria for a plurality of the fields in the identified auction record.

3. A method of claim 2, wherein the action includes creating a new auction record with the same fields and an updated auction start time field.

4. A method of claim 2, wherein the condition is whether a bid price associated with the scheduled auction is less than a identified amount at a identified time after the start time associated with the scheduled auction.

5. A method of claim 2, wherein the condition is whether the scheduled auction ended with a winning final bid from a buyer.

6. A method of claim 2, wherein the action is checking an inventory level and placing an inventory hold by the internal auction application through the seller information management system.

7. A method of claim 2, wherein the action is creating another scheduled auction associated with another start time by the internal auction application, the another start time later than the start time associated with the scheduled auction.

8. A method of claim 2, wherein the action is modifying a product description associated with the scheduled auction by the internal auction application.

9. A method of claim 2, wherein the action is creating a direct product listing with properties similar to the scheduled auction by the internal auction application through the seller information management system.

10. A manufactured system for scheduling auctions, comprising:
    a communications interface hardware device; and
    an internal auction system configured to interface with a communications network through the communications interface device, the internal auction system configured to;
    identify an auction record in an auction properties table of the auction system having a field satisfying a predetermined criteria, the auction record including an auction identifier field, an auction start time field, an auction product identifier field, an auction duration field, an auction lot size field, a starting price field, an original target group of bidders field, and a final bid field;
    automatically check whether a time in the start time field of the identified auction record has passed;
    publish the scheduled auction using data from the identified auction record on the seller's network responsive to a passing of the start time, the scheduled auction visible to buyers through a buyer-side application for a duration in the auction duration field;
    identify a condition-action record in a condition-action table having its auction identifier field match that of the identified auction record, each condition-action record also including a plurality of conditions and associated actions;
    evaluate whether the scheduled auction ended with a winning final bid, wherein the winning final bid is evaluated as having occurred if there has been at least one bid in the scheduled auction or there has been at least one bid which has met a reserve price in the scheduled auction;
    responsive to evaluating that the scheduled auction ended with a winning final bid, automatically check inventory levels in the seller business information system of a product associated with an auction product identifier in the an auction product identifier field and place an available lot size inventory of the product on hold, the lot size obtained from the auction lot size field, and automatically create a new auction with a higher starting price than in the start price field; and
    responsive to evaluating that the scheduled auction ended without a winning final bid, automatically create a direct product sales entry in the seller business information system using the processing device to sell the product in a non-auction format, the direct product sales entry published on a seller e-commerce site, a published price of the product obtained from a price field in the identified auction record.

11. The manufactured system of claim 10, wherein the scheduled auction is associated with a condition of and an action to be executed by the internal auction application.

12. A non-transitory computer-readable medium including instructions for scheduling an auction in an internal auction system using an internal auction application for a seller's e-commerce site, the instructions when executed by a computer processor cause the computer processor to perform the following steps:
    identifying an auction record in an auction properties table of the auction system having a field satisfying a predetermined criteria, the auction record including an auction identifier field, an auction start time field, an auction product identifier field, an auction duration field, an auction lot size field, a starting price field, an original target group of bidders field, and a final bid field;
    automatically checking by the internal auction application whether a time in the start time field of the identified auction record has passed; and
    publishing the scheduled auction using data from the identified auction record on the seller's network site by the internal auction application responsive to a passing of the start time, the scheduled auction visible to buyers through a buyer-side application for a duration in the auction duration field;
    identifying a condition-action record in a condition-action table having its auction identifier field match that of the identified auction record, each condition-action record also including a plurality of conditions and associated actions;
    evaluating using the processing device, whether the scheduled auction ended with a winning final bid, wherein the winning final bid is evaluated as having occurred if there has been at least one bid in the scheduled auction or there has been at least one bid which has met a reserve price in the scheduled auction;
    responsive to evaluating that the scheduled auction ended with a winning final bid, automatically checking inventory levels in the seller business information system of a product associated with an auction product identifier in the an auction product identifier field and placing an available lot size inventory of the product on hold, the lot size obtained from the auction lot size field, and automatically creating a new auction with a higher starting price than in the start price field; and
    responsive to evaluating that the scheduled auction ended without a winning final bid, automatically creating a direct product sales entry in the seller business information system using the processing device to sell the product in a non-auction format, the direct product sales entry published on a seller e-commerce site, a published price of the product obtained from a price field in the identified auction record.

13. A manufactured computer-readable medium of claim 12, wherein the scheduled auction is also associated with properties including a condition of the scheduled auction and an action to be executed by the internal auction application when the condition evaluates to a identified value.

* * * * *